Figure 1:
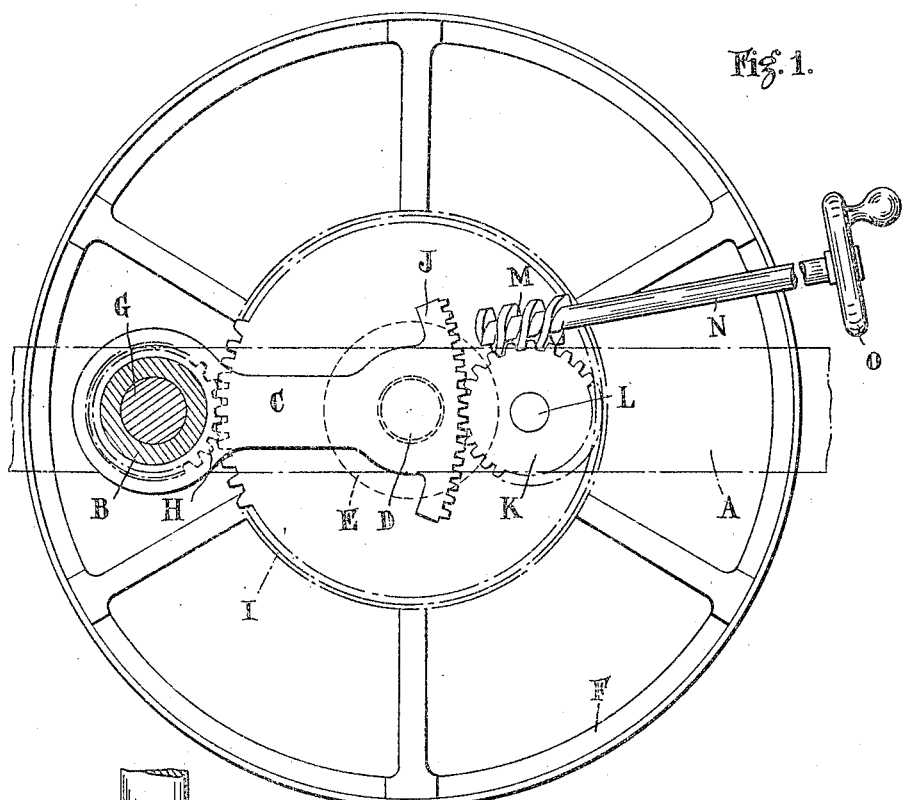

A. WYLES, Jr.
AGRICULTURAL IMPLEMENT.
APPLICATION FILED FEB. 25, 1913.

1,204,224.

Patented Nov. 7, 1916.

Witnesses
C. A. Walter.
L. G. Anger.

Inventor
Albert Wyles, Junior.
by
Attorney.

UNITED STATES PATENT OFFICE.

ALBERT WYLES, JR., OF LEEDS, ENGLAND.

AGRICULTURAL IMPLEMENT.

1,204,224.

Specification of Letters Patent.

Patented Nov. 7, 1916.

Application filed February 25, 1913. Serial No. 750,587.

*To all whom it may concern:*

Be it known that I, ALBERT WYLES, Jr., a subject of the King of England, residing at Leeds, in the county of York, in England, have invented certain new and useful Improvements in Agricultural Implements, of which the following is a specification.

This invention comprises improvements relating to motor driven plows and other power driven vehicular agricultural implements, of that class in which the driving wheels may be raised and lowered relatively to the frame of the implement.

Various means have been hitherto provided to avoid disturbing the engagement of gearing for driving the wheels including mounting the axles in slotted bearings having a curved path struck from the center of the driving gear, and mounting the wheels on cranked axles which may be adjusted by connections from the motor shaft; and it has also been proposed to mount the wheels on rocking arms which may be actuated by a hand lever to lift the frame clear of the ground and at the same time throw in gearing for directly driving the wheels.

The present invention while applicable to power driven agricultural implements generally is especially adapted for use with motor driven implements such as described in the specification of my prior application Ser. No. 682,481, filed 8th March, 1912, and consists in mounting each driving wheel of the machine on or in a separate rocking arm or lever pivoted at one end to the machine frame and the other end of which is free so that it may have movement relatively to the frame, thus permitting each wheel carried by one of said arms to be raised or lowered independently of the other or others in order to compensate for differences of level of the surface on which the implement is traveling. Each of said arms may be in operative connection with a lever extending to a position within easy access of the operator, so that it can be manually operated thereby while the machine is in motion and held in the desired position as by a quadrant and dog or ratchet device, or any other appropriate means, such as worm or equivalent, may be used for actuating and securing the arm and consequently the wheel in the desired position.

The transmission mechanism is so arranged as to be always operative whatever the position of the wheel driven, and to this end the aforesaid arms carrying the wheels are mounted on the same axial center as a shaft or equivalent of the motor transmission, for instance in the case of sprocket and chain driving mechanism I may mount on the pivot of the arm double sprocket-wheels about one of which passes a chain extending to a sprocket on the motor shaft, and about the other of which passes a second chain leading to another sprocket integral with or mounted on the axle or hub of the running wheel in question, or again I may mount on the pivot of the arm a spur-wheel gearing directly or indirectly with a spur-wheel on the motor shaft and with a spur-wheel on the wheel or axle thereof. Any other suitable means of transmission may be used so long as the condition is observed, that one axial center of the transmission coincides with the axis about which the arm carrying the running wheel swings.

To compensate for movement of the transmission mechanism or gearing when adjusting the height of a wheel or wheels on one side of the vehicle in relation to that or those on the other side thereof, I may provide for example in the main sprocket shaft (that is to say the shaft forming the fulcrum of the wheel carrying arms) a differential gearing so that any movement of the transmission mechanism on one side due to adjustment of the wheel will not be transmitted to the mechanism at the other side, and in addition there may be provided means for locking said differential gearing after adjustment whereby the wheels on both sides may be positively and invariably driven from the motor, since if said differential gearing remained unlocked, skidding or slipping of one wheel with regard to the other might take place which is highly undesirable in this class of machine. In place of this differential gearing the wheels may be separately driven through pawl and ratchet gears so that either wheel can overrun the ratchet gear when it requires to turn more quickly than the other running wheel.

It is obvious that it may be sufficient to render only the wheel or wheels on one side of the vehicle adjustable in which case a rocking arm and operating mechanism for each wheel on such side is provided, while the wheel or wheels on the other side may be mounted in any usual or convenient manner.

Figure 2:
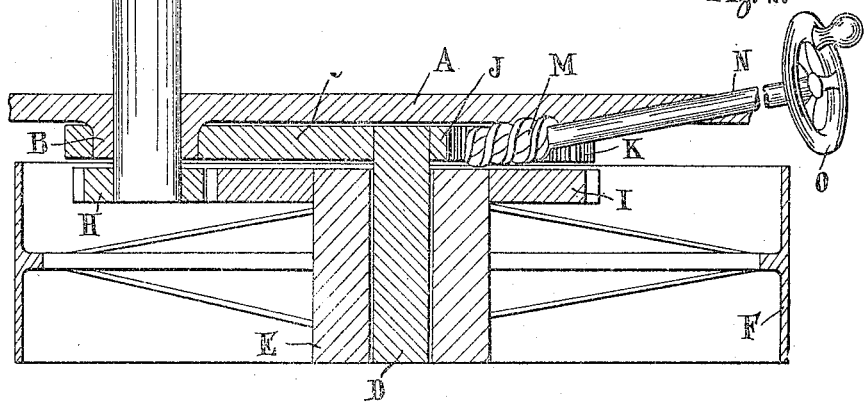

The annexed drawing illustrates diagrammatically in Figure 1 in side elevation, and in Fig. 2 in horizontal section part of the frame work of a power driven vehicle, showing one running wheel and means for its adjustment including a hand operated worm gear.

A represents a part of the frame, and B a boss thereon on which rocks the arm C carrying the gudgeon D on which the hub E of the running wheel F revolves. G is a power shaft traversing the boss B and carrying the pinion H meshing with a toothed wheel I secured to the wheel F. The outer end of the arm C is formed as a toothed quadrant J with which meshes a pinion K mounted on a stud L on the frame A. With pinion K there also meshes a worm M on a shaft N, which latter is carried near to the guiding end of the frame A where it terminates in a hand wheel O.

It will be obvious that the actual construction may be varied within the competence of any engineer and the drawing is intended as a diagrammatic example only.

What I claim as my invention and desire to secure by Letters Patent of the United States is:—

1. In an agricultural implement, the combination of a frame having a projecting boss, a power shaft journaled in said frame and extending axially through the boss, a wheel support pivoted at one end on said boss and having a gear segment on its other end, a gudgeon mounted on said support, means mounted on the frame engaging said segment to adjust the support, a wheel on said gudgeon having its axis parallel with the axis of the power shaft, a gear fast on the wheel, and a pinion on the power shaft adjacent the boss meshing with the said wheel gear, substantially as described.

2. In an agricultural implement, the combination of a frame having a projecting boss, a power shaft journaled in said frame and extending axially through the boss, a wheel support pivoted at one end on said boss and having a gear segment on its other end, a pinion rotatably mounted on the frame and meshing with said segment, a worm mounted on the frame and engaging said pinion; a gudgeon attached to said support, a wheel on said gudgeon having its axis parallel with the axis of the power shaft, a gear fast on the wheel, and a pinion on the power shaft adjacent the boss meshing with the said wheel gear, substantially as described.

In witness whereof I have signed this specification in the presence of two witnesses.

ALBERT WYLES, JUNIOR.

Witnesses:
ALBERT WYLES, Sr.,
CHARLES E. LAYTOR.